United States Patent
Holzapfel

[11] Patent Number: 5,814,812
[45] Date of Patent: Sep. 29, 1998

[54] DEVICE FOR FILTERING OF HARMONIC SIGNAL COMPONENTS

[75] Inventor: Wolfgang Holzapfel, Obing, Germany

[73] Assignee: Dr. Johannes Heidenhain GmbH, Traunreut, Germany

[21] Appl. No.: 704,832

[22] Filed: Aug. 28, 1996

[30] Foreign Application Priority Data

Sep. 1, 1995 [DE] Germany ............... 195 32 246.0

[51] Int. Cl.$^6$ ............................................. G01D 5/34
[52] U.S. Cl. ..................... 250/231.16; 250/231.14; 256/373
[58] Field of Search ................ 250/231.16, 231.13, 250/237 G, 237 R, 21 HR, 231.14, 559.26; 356/375, 373, 374

[56] References Cited

U.S. PATENT DOCUMENTS

| | | | |
|---|---|---|---|
| 4,602,436 | 7/1986 | Ernst | 250/237 G |
| 4,776,701 | 10/1988 | Pettigrew | 356/356 |
| 5,182,613 | 1/1993 | Ieki et al. | 250/231.16 |
| 5,332,896 | 7/1994 | Holzapfel | 250/237 G |
| 5,583,798 | 12/1996 | Franz et al. | 356/375 |

Primary Examiner—Que Le
Attorney, Agent, or Firm—Brinks Hofer Gilson & Lione

[57] ABSTRACT

In a device for filtering harmonic signal components which are created during the scanning of a scale graduation by means of at least one scanning graduation, the graduation marking of the scale or the scanning graduation have a definite shift with respect to equidistant spacing intervals. The shift is chosen such that the signal components of the n-th even harmonic are eliminated by virtue of the resulting phase shift while at the same time the phase position for the signal components of the fundamental wave remains constant and thus independent of the scanning site. In particular, the depth of modulation of the fundamental wave is not reduced.

9 Claims, 4 Drawing Sheets

DEVICE FOR FILTERING OF HARMONIC SIGNAL COMPONENTS

BACKGROUND OF THE INVENTION

The present invention is related to a device for filtering harmonic signal components which can be used in a position measuring system for determining the changes in position of two objects moving relative to each other. In particular, the device is suitable for use within an interferential measurement system that utilizes interference by partial light beam bundles.

In known position measuring systems, the most diverse physical principles are employed to extract a signal. Thus, one distinguishes between photoelectric and optical, magnetic, inductive and capacitive scanning principles. But what all methods have in common is the fact that a periodic scale graduation is sampled by means of a scanning graduation and the resulting sampled signal is evaluated as the measurement signal. The periodicity of the scanning signals is determined by the period of the division or the increment in the scale graduation of the grating used. In optical measurement systems, this increment is specified, for example, by the widths of the light-transmitting and the light-nontransmitting graduation markings of a scale graduation constructed as an amplitude grating.

If the scanning graduation and the scale graduation are moved relative to each other, a counting pulse is derived from each increment sampled, which adds up the individual pulses with the correct algebraic sign, and then processes the sum as a measured value for extracting the length or angle information.

The scale graduations of the gratings used, i.e., the corresponding graduation marking/gap relations of an amplitude grating, for example, will generally deviate from the ideal trend of the division ratio. Moreover, as a result of manufacturing tolerances, the graduation markings of the scale graduation may have blunted edges.

As a result of such inaccuracies, the periodic output signals extracted generally do not have the desired ideal trend, for example, purely sinusoidal, but instead usually contain upper waves or harmonic oscillations. But for a high-precision position determination, it is necessary that the sampled signals extracted from the scale graduation be as free as possible of harmonics.

A number of possibilities exist for filtering out the harmonics within the known position measuring systems. U.S. Pat. No. 4,602,436 discloses a filtering method that is known as "arcsin scanning". This filtering principle is based on a special scanning graduation, where the positions of the graduation markings are shifted relative to the regular, equidistant, nominal positions by a small shift d. The defined shifts of the graduation markings produce local phase shifts in the corresponding signal components which results in a destructive interference of the odd harmonic components. The result in this case is a phase shifting of both the fundamental wave and also the harmonic signal components which are present.

Basically similar methods for harmonic filtering are disclosed in U.S. Pat. No. 5,332,896, where a definite phase shift of fundamental wave and harmonics is accomplished through a suitably selected shift of the graduation markings of the scanning graduations.

All of the proposed devices or methods for filtering of harmonic signal components have certain disadvantages. Thus, the phase shift of the interfering partial beams is dependent on the scanning location and this reduces the degree of modulation of the resulting measurement signal. This, in turn, has a negative impact on the signal processing downstream.

The reduction of the modulation depth will vary according to the filter technique chosen. For example, when filtering all harmonics by means of the method known as vernier arcsin filtering according to U.S. Pat. No. 5,332,896, the reduction factor is 0.5, while in the arcsin filtering of odd harmonics according to U.S. Pat. No. 4,602,436, the reduction factor is 0.785. The reduction factor is defined as being the ratio between the depth of signal modulation with harmonic filtering and the depth of modulation without filtering.

In the case of so-called interferential position measuring systems, such as are known from U.S. Pat. No. 4,776,701, for example, it is now the amplitude of the second harmonic which causes the unwanted signal distortion, while the other harmonic components are negligible compared to this. Here again, the graduation marking and gap widths along the scale graduation used, which deviate from an ideal division, cause the formation of unwanted harmonic signal components.

It is thus desirable to create a device for filtering of harmonic signal components, especially for position measuring systems using the interference method, in which a definite suppression of certain harmonic signal components is possible. It is also desirable that the depth of modulation of the fundamental wave not be reduced, if possible, by the filtering.

SUMMARY OF THE INVENTION

According to the present invention, only the desired even-numbered harmonic components are designated for elimination from the combined sampled signal. The fundamental wave remains substantially unchanged, that is, the modulation depth of the fundamental wave has a reduction factor of 1 or almost 1, thus producing the desired sampled signal, unaffected by even-numbered harmonic components.

Depending on the design of the interferential position measuring system as a three or a multi-grating measuring device, the desired even-numbered harmonic signal component can be filtered out by an appropriate translation of the principles according to the present invention. In one embodiment described hereafter, the second harmonic is filtered.

The device according to the present invention can be used within an interferential position measuring system as either a transmitted light and an incident light embodiment.

Moreover, the device according to the present invention can be realized both with phase gratings and with amplitude gratings as a scanning or a scale graduation.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
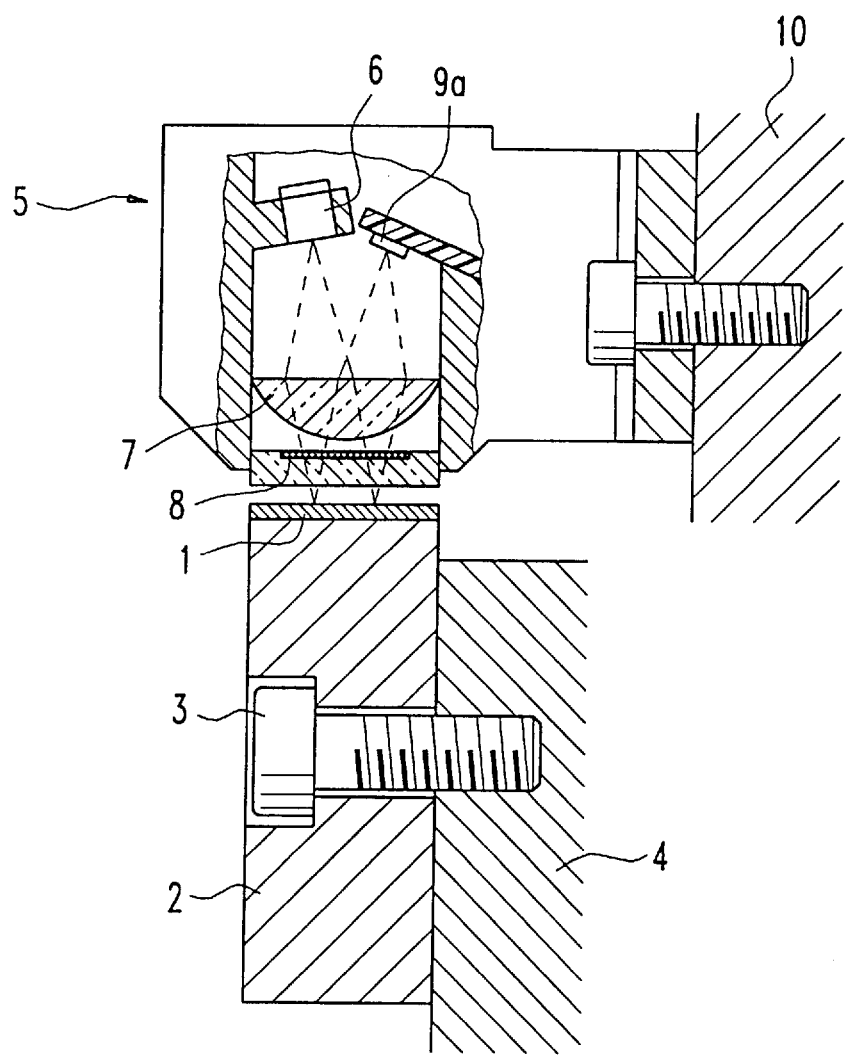
FIG. 1 illustrates a cross-sectional view of a first preferred embodiment of an interferential position measuring system according to the present invention.

FIG. 1 illustrates a cross-sectional view of a first preferred embodiment of an interferential position measuring system according to the present invention. Preferably, the position measuring system is designed as an incident-light arrangement for a length measuring system. As an alternative, of course, it is also possible to use the device according to the present invention in a position measuring system which is designed as an angle measuring system and/or is operated with transmitted light.

The position measuring system illustrated in FIG. 1 includes a scale 1, consisting of a steel body, which carries on its surface a scale graduation in the form of preferably a reflection phase grating. The phase grating preferably has a graduation period of 4 mm and consists of rectangular gold steps around 0.2 mm tall and 2 mm wide. These steps are mounted at the interval of the graduation period of 4 mm on the gold-coated and, thus, also reflecting surface of the steel body of the scale 1. The scale 1 is arranged on a carrier 2, which is connected to a part 4 of a processing machine by means of a detachable connection preferably in the form of a screw 3 and a matching threading.

The scale 1 is sampled by a scanning unit 5 which can be shifted linearly, i.e., perpendicular to the plane of the drawing. Inside the scanning unit 5 there is a light source 6, preferably a LED, in front of which is arranged a condenser optics 7. Next within the scanning unit 5, facing the scale 1, is the scanning graduation 8. The scanning graduation 8 is preferably a transmitted-light phase grating. Three detector elements 9a are arranged to capture the reflected radiation components, only one of which can be seen in FIG. 1. Preferably photocells are provided as suitable detector elements 9a.

Through a screw connection, the scanning unit 5 is connected to a carriage 10, only part of which is shown, which is used for the defined linear displacement of the scanning unit 5 along the scale 1.

The plane wave of light created by the source 6 through the condenser optics 7 is diffracted into primarily three different directions upon passing through the phase grating of the scanning graduation 8. Another diffraction, as well as a reflection of the diffracted partial beam, occurs on the reflection phase grating of the scale graduation 1. The reflected partial beams again pass through the phase grating of the scanning graduation 8 and are once again diffracted. In the focal plane of the lens 7, now acting as collimator optics, the interfering partial beams are converted into signal currents by the detector elements 9a. Downstream of the detector elements 9a is a familiar processing electronics (not shown), which interpolates the signals resulting from a relative shifting of scale 1 and scanning unit 5 and appropriately adds up the sampled increments of the scale graduation 1.

As an alternative to having the scanning and scale graduations implemented as phase gratings, amplitude gratings can also be used.

Figure 2:
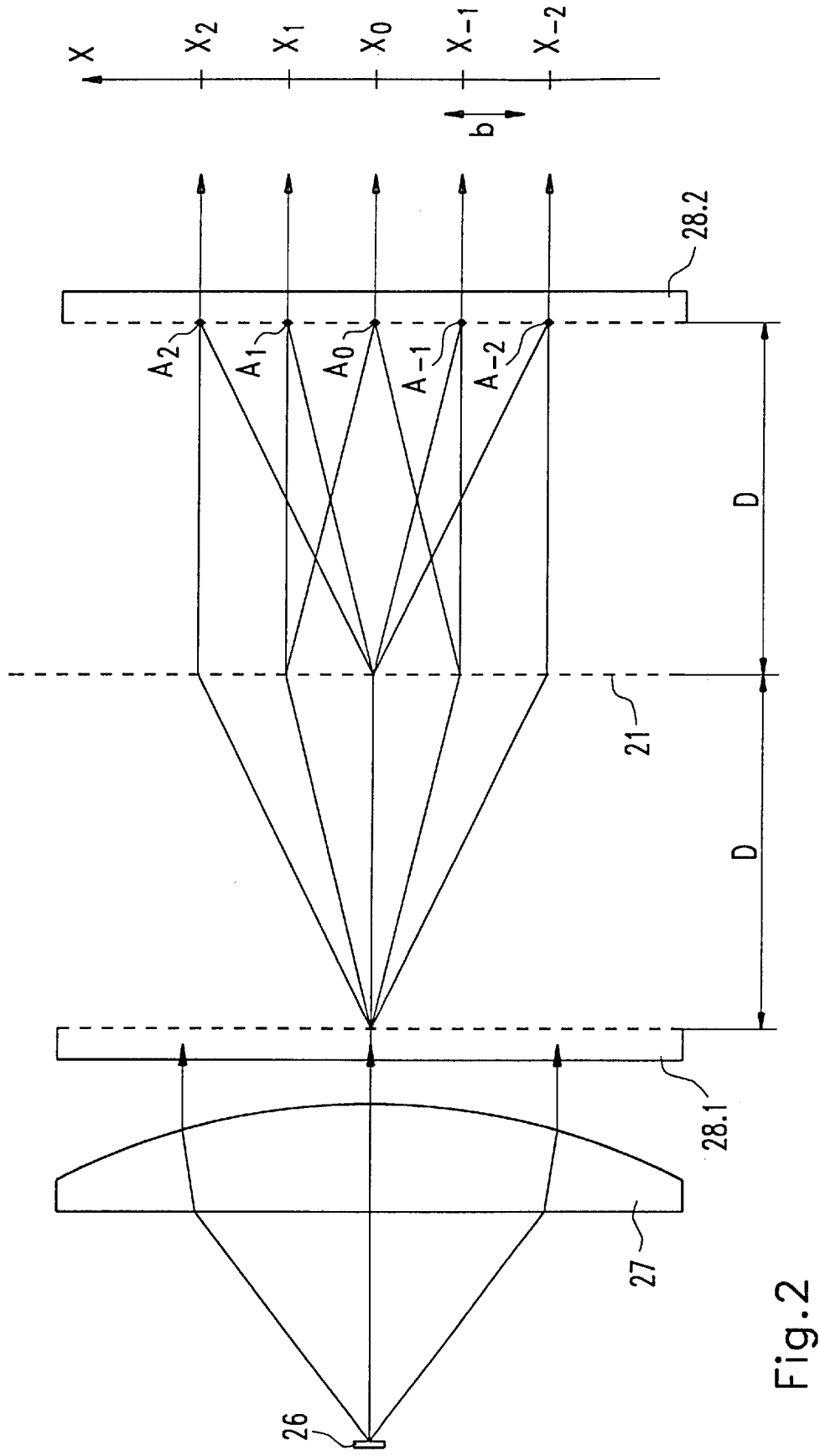
FIG. 2 illustrates the unfolded beam path of the position measuring system shown in FIG. 1.

With reference to FIG. 2 the unfolded beam path of the position measuring system shown in FIG. 1 is illustrated. Elements that are similar to those shown in FIG. 1 are designated by the same reference numbers prefaced by a 2. The direction of propagation of the beam through the condenser optics 27, a first scanning graduation 28.1, the scale 21, and a second scanning graduation 28.2 is shown. Both the scale 21 and the two scanning graduations 28.1, 28.2 are designed as phase gratings. The scanning graduations 28.1 and 28.2 are shown as two separate elements but preferably they are one as shown in FIG. 1.

At the phase grating of the first scanning graduation 28.1, the impinging partial beam of the incident plane wave is first diffracted in several directions. For reasons of clarity, hereafter there is only shown the path of the middle partial beam of the impinging plane wave. At the phase grating of the scale graduation 21 the impinging portion of the incident partial beam is in turn diffracted in several directions. In the representation of FIG. 1, only the further course of those pairs of partial beams is indicated from the scale 21 onward, whose path between the first and second scanning graduation 28.1, 28.2 forms a parallelogram, and which are consequently capable of interfering after the second scanning graduation 28.2, because they have traveled the same optical path lengths.

The points of impingement $A_m$ where $m=0, \pm 1, \pm 2, \ldots$ of the interfering partial beams on the second scanning graduation 28.2 form here an almost equidistant raster, extending in the scanning direction x. The distances $x_m$ between the point of impingement of the nonshifted partial beam $A_o$ and the points of impingement of the shifted partial beams $A_m$ are approximately given by equation (1):

$$x_m = m*b, \qquad (1)$$

where b is the raster interval and is approximately equal to $$b \approx D*\lambda/d, \qquad (2)$$

where, D designates the distance of the scanning graduations 28.1, 28.2 from the scale 21, $\lambda$ is the wavelength of the light source 26, and d is the graduation period of the scale 21. For typical values of D=1 mm, X=860 nm, and d=4 mm, the raster interval b will be b=215 mm.

The present invention utilizes the fact that the points of impingement $A_m$ of the pairs of partial beams, which generate the fundamental wave of the signal as well as all odd harmonics, have an odd index m. Accordingly, the points of impingement of the corresponding partial beams with an even index m are assigned to the even harmonics, i.e., m=2, 4, 6, . . . .

For the desired filtering of the second harmonic (m=2) according to the present invention, the interfering partial beams of the second harmonic are phase-shifted in a definite way, so that these signal components can be eliminated. Since the points of impingement of the partial beams which create the second harmonic are spatially separated from the points of impingement of the partial beams which create the fundamental wave, a definite elimination of the unwanted even harmonics, especially the second harmonic, can be accomplished by suitable choice of the shift of the graduation marking or the period of the scanning graduation.

The definite shifts $\delta 1(x)$ and $\delta 2(x)$ of the graduation markings, 28.1, 28.2 relative to the equidistant spacing intervals that are required for such a phase shifting of the second harmonic are consequently periodic functions with period 2b, i.e., $$\delta 1(x) = \delta 1(x+2*b) \qquad (3.1)$$

and $$\delta 2(x) = \delta 2(x+2*b) \qquad (3.2)$$

These two conditions result since, as explained above, the fundamental wave impinges at the two sites of impingement $A_1$ and $A_{-1}$ on the second scanning graduation 28.2. At both of these sites of impingement, the two partial beams of the fundamental wave should undergo no mutual phase shifting, or they must at least undergo the same phase shifting, in order not to reduce the depth of modulation of the fundamental wave. Based on these considerations, there results for the second scanning graduation 28.2 the periodicity condition for the shift of the graduation marking, as indicated in equation 3.2. The same holds for the periodicity condition in equation 3.1, which is related to the sites of impingement on the first scanning graduation 28.1.

The conditions for the required shift within the two scanning graduations 28.1 and 28.2 should be transformed into the following condition (3') when there is only one scanning graduation in an incident-light arrangement, through which the beam passes twice, as was explained by means of FIG. 1:

$$\delta(x)=\delta(x+2*b) \quad (3')$$

At the same time, it should be noted that the particular shift of the graduation marking is chosen such that the phase shifts experienced by the partial beams of the fundamental wave at the two scanning graduations 28.1, 28.2, or on a scanning graduation passed through twice, mutually compensate for each other as much as possible and therefore have an ever constant phase shift, independent of the place of scanning. With respect to the shift of the graduation marking this means:

$$\delta 1(x)=\delta 2(x+b) \quad (4)$$

For the incident-light case, passing twice through the scanning graduation, this means:

$$\delta(x)=\delta(x+b) \quad (4)$$

Thus, for the fundamental wave components of the resulting signal, the depth of modulation remains substantially unchanged as desired, so that a reduction factor of 1 or nearly 1 remains.

Because of the chosen periodic shift of the graduation marking, the interfering partial beams of the second harmonic, on the other hand, will experience a mutual phase shift, depending on the location, which in turn leads to a corresponding phase shift $2*2*\pi(\delta 1(x)+\delta 2(x))$ of the respective signal component.

The condition for elimination of the n-th harmonic (e.g., n=2), by virtue of averaging over the scanning location x, can be specified with respect to the required shift $\delta 1(x)$ and $\delta 2(x)$ in the case of two scanning graduations that are traveled through:

$$\int_{-b}^{+b} e^{(i*2n*\pi*(\delta 1(x)+\delta 2(x))/d)}\, dx = 0 \quad (5)$$

In the case of only a single scanning graduation, which is traveled through twice in an incident-light arrangement, i.e., $\delta(x)=\delta 1(x)=\delta 2(x)$, this condition for the n-th harmonic (e.g., n=2) should be transformed as follows:

$$\int_{-b}^{+b} e^{i*4n*\pi*\delta(x)/d}\, dx = 0 \quad (5')$$

In the following preferred embodiment, an incident-light arrangement is assumed, in which a single scanning graduation is traveled through twice, that means there are two identical scanning graduations. A function $\delta(x)$ for the corresponding shift, which fulfills the mentioned conditions, is shown in the lower part of FIG. 3(*a*). Here, there is an shift $\delta(x)$ of $$\text{and } \delta(x) = \begin{cases} +d/16, \text{ for } 0 < x < b, \\ -d/16, \text{ for } b < x < 2b. \end{cases}$$

which describes a shift of the graduation marking of +d/16 from the equidistant nominal positions with period 2b.

Because of such a shift of the graduation markings there results a phase shift of the second harmonic of $\pm\pi/2$, thus filtering out this harmonic signal component.

Figure 3A:
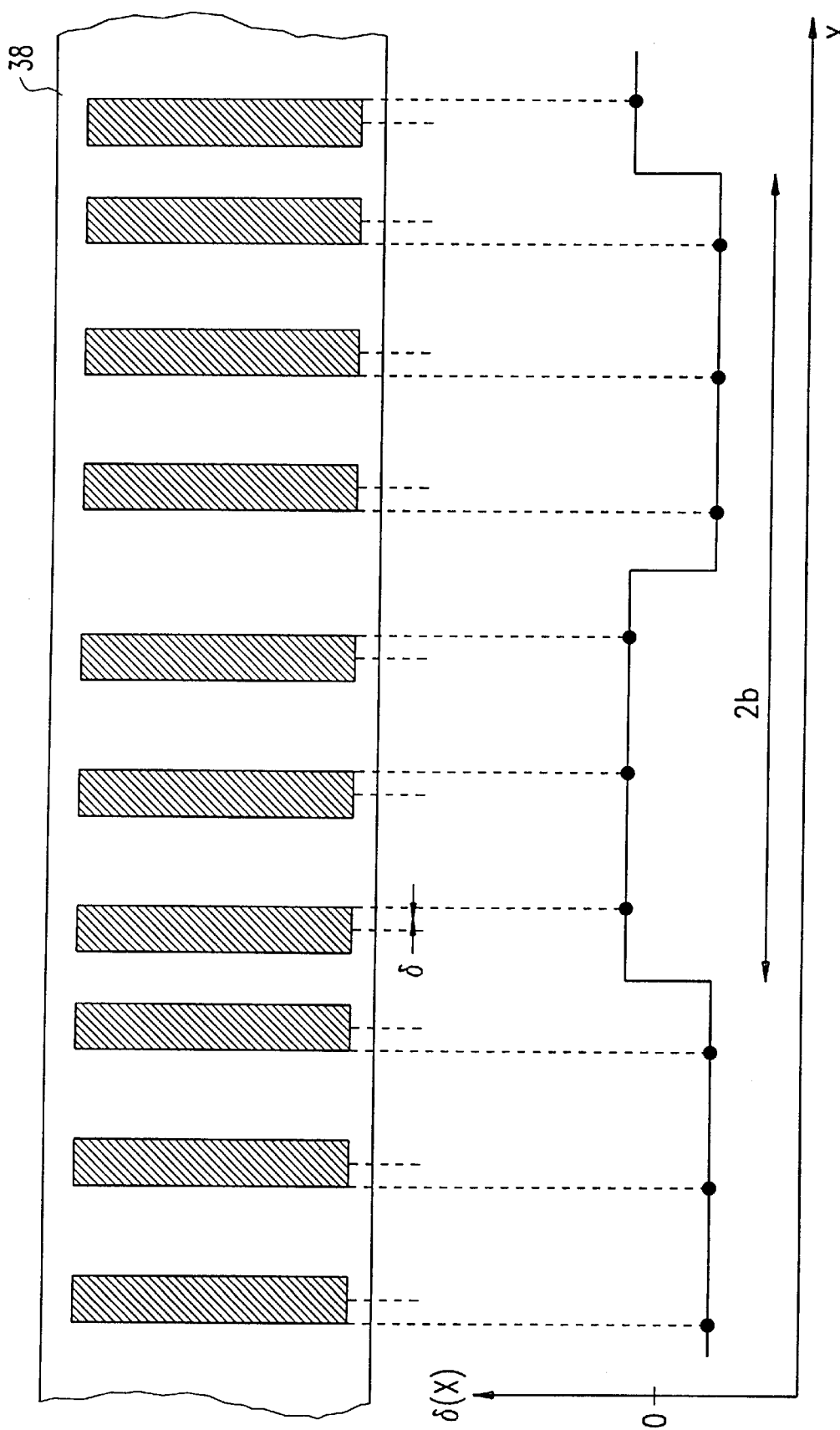
FIG. 3a illustrates a first preferred embodiment of a scanning graduation of the device according to the present invention.

Furthermore, FIG. 3*a* shows a top view of the correspondingly constructed scanning graduation 38 with the graduation marking displaced according to the present invention.

Figure 3B:
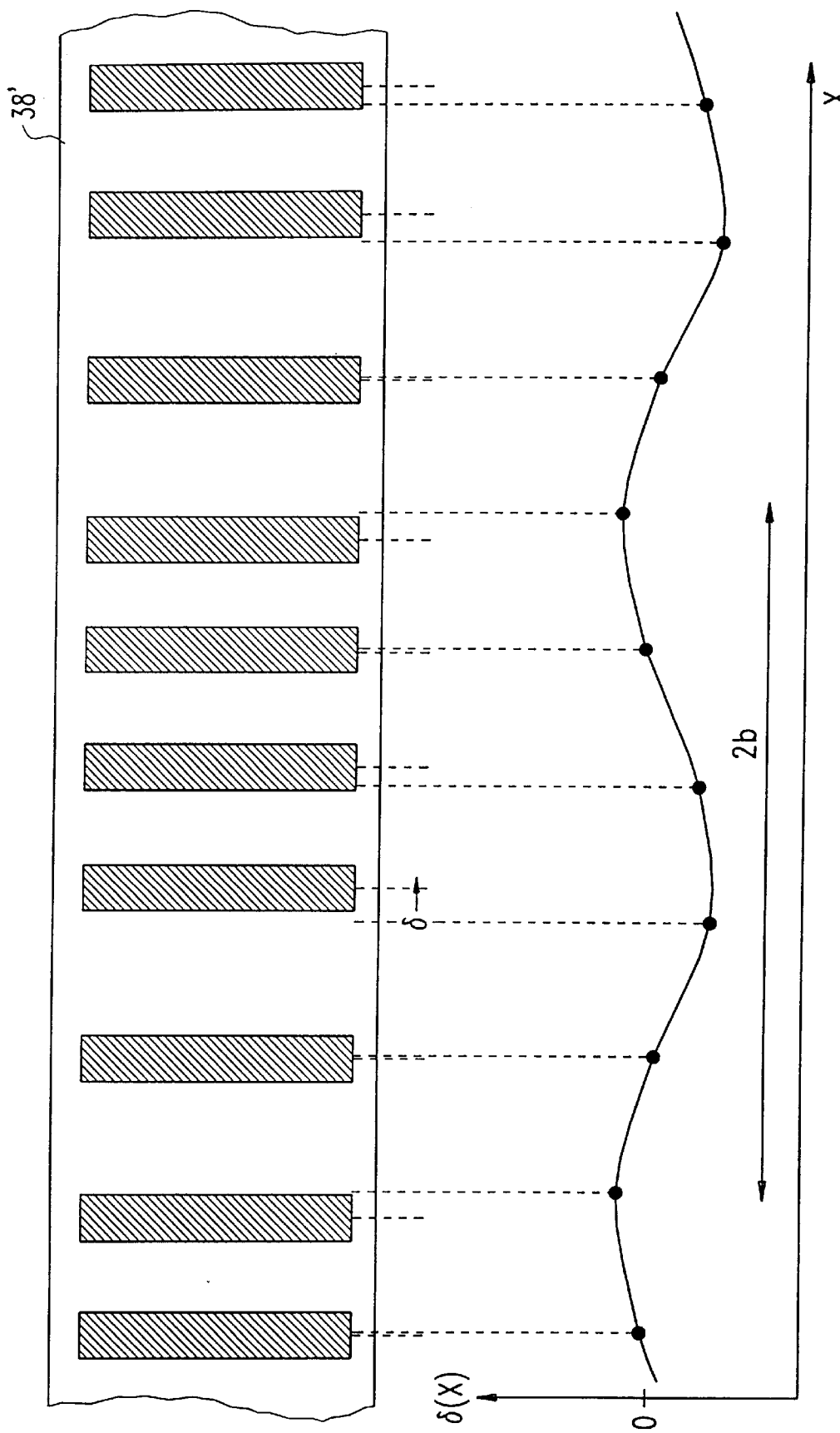
FIG. 3b illustrates a second preferred embodiment of a scanning graduation of the device according to the present invention.

An alternative solution to the above-discussed conditional equation for the shift $\delta(x)$ of a twice-traveled scanning graduation is depicted in the lower half of FIG. 3*b*. The shift $\delta(x)$ of the graduation marking from the nominal positions is chosen to be sinusoidal in this embodiment, according to equation (7):

$$\delta(x)=\delta^*\sin(\pi^*x/b) \quad (7)$$

The value for d is found from the conditional equation $J_0(8*\pi*\delta/d)=0$, $J_0$ being a Bessel function of 0-th order. Possible solutions for $\delta$ are $\delta=d/10.451$; $d/4,553$, . . . .

The upper part of FIG. 3*b* shows, in turn, the correspondingly constructed scanning graduation 38' with the sinusoidal shift of the graduation marking.

Similarly to the described example for the filtering of the second harmonic, other even harmonic components can be filtered out from the combined signal like the second harmonic by appropriate choice of $\delta 1(x)$ and $\delta 2(x)$. The above-mentioned equation (5) also remains valid for the case of the desired filtering of the n-th harmonic (n=2, 4, 6, . . . ). Depending on the measurement system, the corresponding choice of the shift thus ensures that a certain harmonic component can be filtered and the depth of modulation of the fundamental wave is affected as little as possible by the filtering.

In principle, it is also possible to use the two scanning graduations 28.1, 28.2 of FIG. 2 as stationary scale graduations, relative to which is shifted the division 21, arranged in between and now acting as the scanning graduation, including the light source 26, the condenser optics 27, and the detector elements (not shown). The only requirement is to provide the shift, selected according to the above conditions, on that division which is traveled through twice. In the latter case, consequently, the shift should be provided on the two scale graduations.

It is to be understood that the forms of the present invention described herewith are to be taken as preferred examples and that various changes in the shape, size and arrangement of parts may be resorted to, without departing from the spirit of the present invention or scope of the claims.

What is claimed is:

1. A device for filtering harmonic signal components, the device comprising:

a scale having scale graduation markings sequentially arranged in a measuring direction;

a scanning unit having scanning graduation markings sequentially arranged in the measuring direction wherein a scanning signal is created during the scanning of the scale graduation markings by the scanning graduation, said scanning signal consisting of a fundamental wave and even harmonic signal components wherein either the scale graduation markings or the scanning graduation markings do not have an equidistant spacing interval but rather have a definite shift from an equidistant spacing interval, wherein said shift causes a resulting phase shift of said even harmonic signal components, the shift being chosen so that a n-th even harmonic signal component is eliminated by virtue of said resulting phase shift, while said fundamental wave remains unchanged.

2. A device according to claim 1 wherein the shift for either two scanning graduation markings or two scale graduation markings satisfies the following conditions:

$$\delta 1(x) = \delta 1(x+2*b),$$

$$\delta 2(x) = \delta 2(x+2*b)$$

and $$\delta 1(x) = \delta 2(x+b),$$

where $b \approx D*\lambda/d$ and D defines a distance between the scale graduation markings and scanning graduation markings, $\lambda$ a wavelength of a light source, and d a graduation period of the scale.

3. A device according to claim 1 wherein the shift for either one scanning graduation marking, or one scale graduation marking satisfies the following conditions:

$$\delta(x) = \delta 1(x+2*b),$$

and $$\delta(x) = \delta(x+b),$$

where $b \approx D*\lambda/d$ and D defines a distance between the scanning graduation markings and the scale graduation markings, $\lambda$ a wavelength of a light source, and d a graduation period of the scale.

4. A device according to claim 2 wherein the shift for eliminating the n-th even harmonic satisfies the following condition:

$$\int_{-b}^{+b} e^{i*2n*\pi*(\delta 1(x)+\delta 2(x))/d} \, dx = 0. \tag{5}$$

5. A device according to claim 3 wherein the shift for eliminating the n-th even harmonic satisfies the condition:

$$\int_{-b}^{+b} e^{i*4n*\pi*\delta(x)/d} \, dx = 0. \tag{5'}$$

6. A device according to claim 1 wherein the shift for eliminating the n-th even harmonic satisfies the condition:

$$\delta(x) = \begin{cases} +d/16, \text{ for } 0 < x < b, \\ -d/16, \text{ for } b < x < 2b. \end{cases}$$

7. A device according to claim 5 wherein to eliminate a second harmonic, the shift is defined by $\delta(x) = \delta*\sin(\pi*x/b)$, with the secondary condition $J_o(\delta*\pi*s/d) = 0$, is provided.

8. A device according to claim 1 wherein both the scale graduation markings and the scanning graduation markings are designed as a phase grating.

9. A device according to claim 1, wherein the scale and the scanning unit are designed as a length measuring system.

* * * * *

UNITED STATES PATENT AND TRADEMARK OFFICE
CERTIFICATE OF CORRECTION

| | |
|---|---|
| PATENT NO. : | 5,814,812 |
| DATED : | September 29, 1998 |
| INVENTOR(S) : | Wolfgang Holzapfel |

It is certified that error appears in the above-identified patent and that said Letters Patent is hereby corrected as shown below:

In claim 4, please change $$\text{``}\int_{-b}^{+b} e^{i*2n*\pi*(\delta 1(x)+\delta 2(x))/d} dx=0 \text{''}$$

to $$-- \int_{-b}^{+b} e^{(i*2n*\pi*(\delta 1(x)+\delta 2(x))/d)} dx=0 --.$$

Signed and Sealed this

Sixth Day of February, 2001

Attest:

Q. TODD DICKINSON

*Attesting Officer*  *Director of Patents and Trademarks*